(12) United States Patent
Singh et al.

(10) Patent No.: US 9,800,490 B2
(45) Date of Patent: *Oct. 24, 2017

(54) TESTING BY SIMULATION USING VARIATIONS OF REAL-TIME TRAFFIC

(71) Applicant: Aruba Networks, Inc., Sunnyvale, CA (US)

(72) Inventors: Amit Singh, Santa Clara, CA (US); Kranti Yadhati, Milpitas, CA (US); Muthukumar Subramanian, Fremont, CA (US)

(73) Assignee: ARUBA NETWORKS, INC., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/087,952

(22) Filed: Mar. 31, 2016

(65) Prior Publication Data

US 2016/0218952 A1 Jul. 28, 2016

Related U.S. Application Data

(63) Continuation of application No. 14/445,961, filed on Jul. 29, 2014, now Pat. No. 9,306,823.

(51) Int. Cl.
*H04L 12/26* (2006.01)

(52) U.S. Cl.
CPC ............ *H04L 43/50* (2013.01); *H04L 43/028* (2013.01); *H04L 43/0823* (2013.01)

(58) Field of Classification Search
CPC . H04L 1/00; H04L 12/26; H04L 12/28; H04L 43/028; H04L 43/0823; H04L 43/50; G06F 11/00; G06F 15/177

See application file for complete search history.

(56) References Cited

U.S. PATENT DOCUMENTS

| | | | |
|---|---|---|---|
| 6,314,531 B1* | 11/2001 | Kram | H04M 3/242 709/243 |
| 7,051,240 B2* | 5/2006 | Manley | H04L 43/50 714/37 |
| 7,467,333 B2 | 12/2008 | Keeton et al. | |
| 7,843,840 B2* | 11/2010 | Vankov | H04L 12/2697 370/242 |
| 8,908,539 B1* | 12/2014 | Pani | H04L 43/0811 370/248 |
| 9,306,823 B2* | 4/2016 | Singh | H04L 43/0823 |
| 9,658,934 B2* | 5/2017 | Ye | G06F 11/263 |
| 2003/0156633 A1 | 8/2003 | Rix et al. | |
| 2003/0177416 A1 | 9/2003 | Manley et al. | |
| 2009/0052333 A1* | 2/2009 | Vankov | H04L 43/50 370/242 |
| 2009/0061860 A1 | 3/2009 | Jiang | |

(Continued)

*Primary Examiner* — Tri H Phan
(74) *Attorney, Agent, or Firm* — Hewlett Packard Enterprise Patent Department

(57) ABSTRACT

A system with at least one device including a hardware processor, performs the steps of receiving, by the system, a packet from a second system to be transmitted to a third system, forwarding, by the system to the third system, the packet received from the second system; modifying a portion of the packet to obtain a modified packet that falsely identifies a fourth system as a source of the modified packet, and transmitting, by the system to the third system, the modified packet identifying the fourth system as the source of the modified packet.

19 Claims, 5 Drawing Sheets

(56) References Cited

U.S. PATENT DOCUMENTS

| | | | |
|---|---|---|---|
| 2012/0106358 A1* | 5/2012 | Mishra | H04L 43/0817 370/242 |
| 2014/0119203 A1* | 5/2014 | Sundaram | H04L 43/50 370/250 |
| 2014/0207935 A1 | 7/2014 | Gphshtein et al. | |
| 2014/0269365 A1* | 9/2014 | Olgaard | H04L 43/50 370/252 |

* cited by examiner

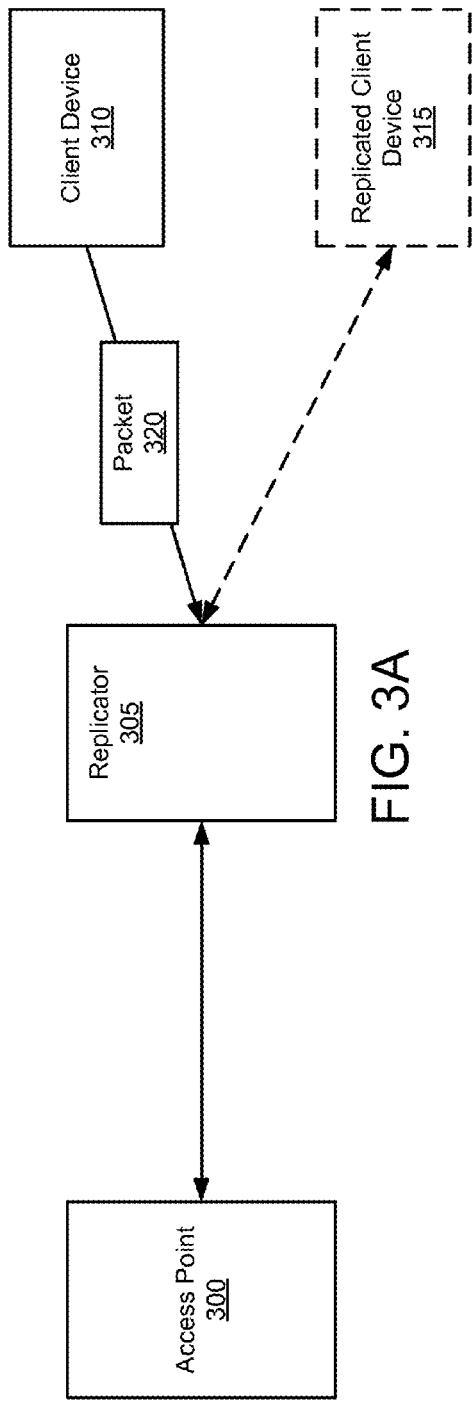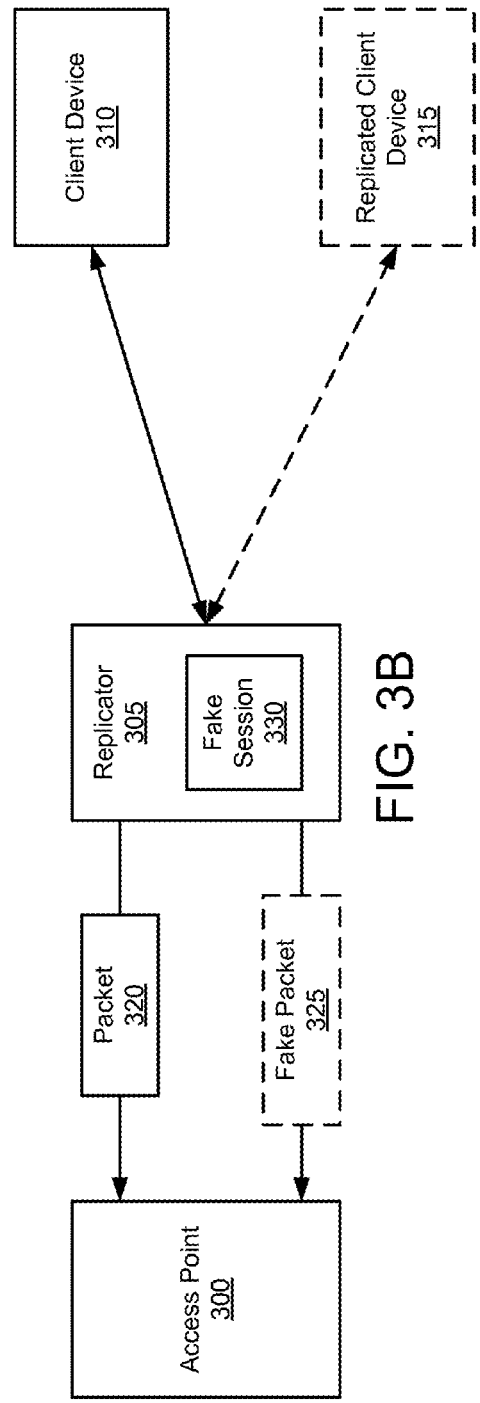

TESTING BY SIMULATION USING VARIATIONS OF REAL-TIME TRAFFIC

BACKGROUND

Wired and/or wireless networks are increasing in both size and popularity around the world. In a crowded city, it is not uncommon to be able to join tens or hundreds of different networks. Businesses have also been installing larger and more complex employee networks. When deploying a new network, large or small, and/or when upgrading or modifying an existing network, testing to ensure that the network is functioning correctly is of critical importance.

Overview

In general, in one aspect, the invention relates to a first system. The first system comprising: at least one device including a hardware processor; receiving, by the first system, a first packet from a second system to be transmitted to a third system; forwarding, by the first system to the third system, the first packet received from the second system; modifying a portion of the first packet to obtain a second packet that falsely identifies a fourth system as a source of the second packet; and transmitting, by the first system to the third system, the second packet identifying the fourth system as the source of the second packet.

In general, in one aspect, the invention relates to a first system. The first system comprising: at least one device including a hardware processor configured to perform operations comprising: receiving, by the first system, a first set of packets from a second system to be transmitted to a third system; forwarding, by the first system to the third system, the first set of packets received from the second system; identifying a pattern or protocol associated with the first set of packets; generating a second set of packets, based on the pattern or the protocol, that that falsely identify a fourth system as a source of the second set of packets; and transmitting, by the first system to the third system, the second set of packets identifying the fourth system as the source of the second set of packets.

In general, in one aspect, the invention relates to a non-transitory computer readable medium comprising instructions. The instructions, when executed by one or more devices, cause performance of operations comprising: receiving, by a first system, a first packet from a second system to be transmitted to a third system; forwarding, by the first system to the third system, the first packet received from the second system; modifying a portion of the first packet to obtain a second packet that falsely identifies a fourth system as a source of the second packet; and transmitting, by the first system to the third system, the second packet identifying the fourth system as the source of the second packet.

Other aspects and advantages of the invention will be apparent from the following description and the appended claims.

BRIEF DESCRIPTION OF DRAWINGS

FIGS. 3A-3D show an example in accordance with one or more embodiments of the invention.

DETAILED DESCRIPTION

Figure 1:
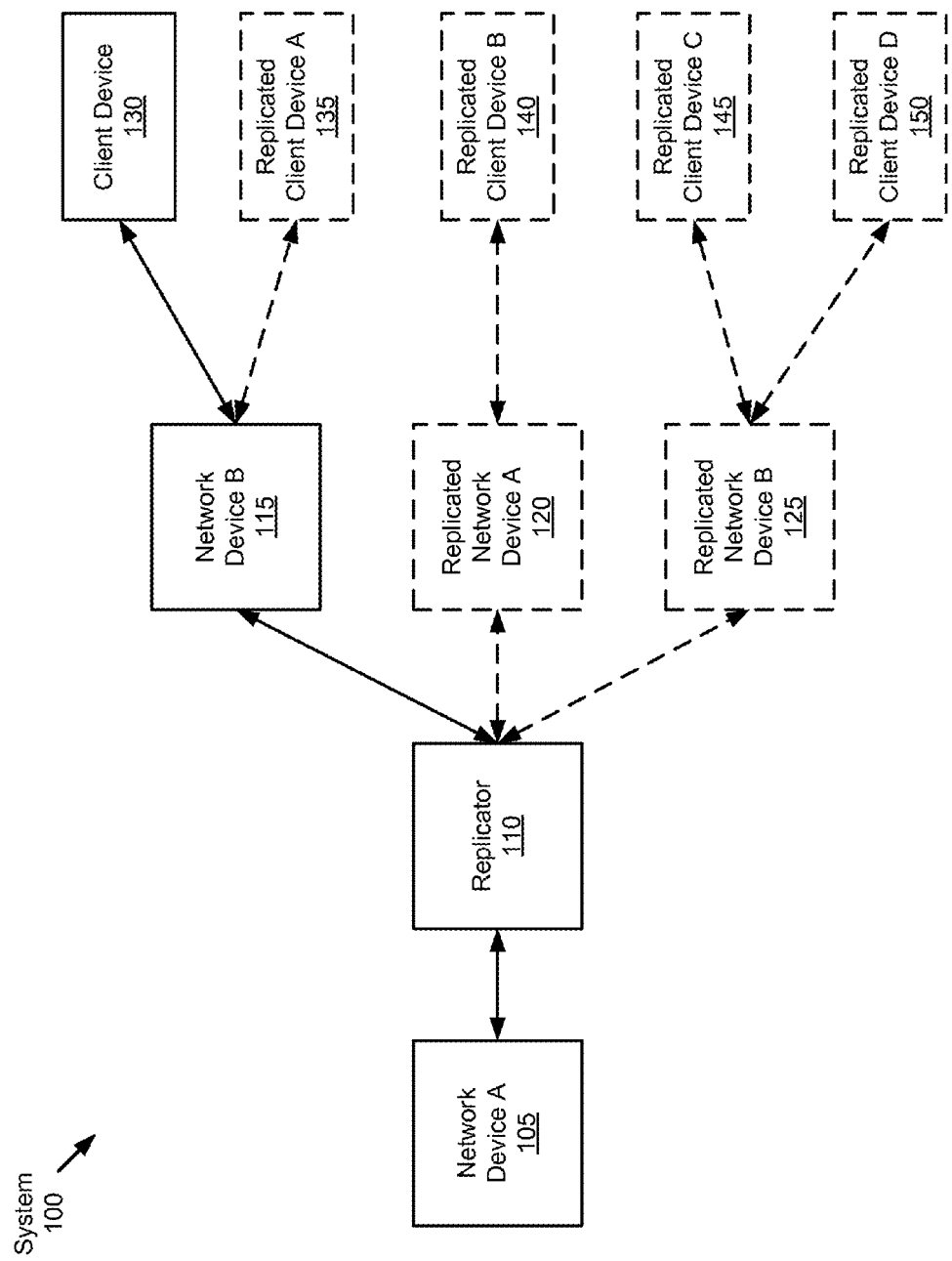
FIG. 1 shows a schematic diagram in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and computer readable medium for simulating traffic using variations of real-time traffic. Generally, a first system receives real traffic in the form of packets from a second system. The packets are not intended for the first system; rather, the packets have a destination of a third system. The first system performs deep packet inspection (DPI) on the packets, and forwards the packets to their destination. Based on the DPI, fake packets may be generated by modifying the received packets. These fake packets may be sent to their intended destination to test how the destination will respond. When responses to "real" packets are received, they are forwarded to their intended destination. However, when responses to "fake" packets are received, they are dropped. Optionally, templates may be created based on the observed traffic patterns, and learning algorithms may be applied.

FIG. 1 shows a system (100) in accordance with one or more embodiments. As shown in FIG. 1, the system (100) has multiple components, including network device A (105), network device B (115), a replicator (110), a client device (130), and many replicated devices (e.g., replicated network device A (120), replicated network device B (125), replicated client device A (135), replicated client device B (140), replicated client device C (145), and replicated client device D (150)). In one or more embodiments, the components of system (100) are connected via a network. The network may be a network of any size including the Internet, and may contain any number of wired and/or wireless connections. In one or more embodiments, the components of system (100) are located within the same secondary network (e.g., an Internet Protocol (IP) subnet), and/or are in the same level (e.g., Level 2) in the Open Systems Interconnection Model (OSI). Alternatively, some components may be located in different secondary networks and/or on different levels from other network devices.

In one or more embodiments, network device A (105) and network device B (115) are hardware systems/devices that are configured to receive packets (e.g., unicast packets, multicast packets) and transmit the packets to other devices connected to the network device, such as client device (130), or other network devices. The network device may include one or more hardware processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), a radio-frequency (RF) frontend, and numerous other elements and functionalities. The hardware processor(s) may be an integrated circuit for processing instructions. For example, the hardware processor(s) may be one or more cores, or micro-cores of a processor. In one or more embodiments of the invention, network device A (105) and/or network device B (115) may be computers, servers, racks, laptops, access points, controllers, routers, switches, and/or any other suitable device.

In one or more embodiments, the client device (130) may be a computing system capable of wirelessly sending and/or receiving information. For example, the client device (130) may be a laptop computer, smart phone, personal digital assistant, tablet computer, or other mobile device. By way of an example, a client device may be directly wired or wirelessly communicatively connected to a single access point, which is directly communicatively connected to a single controller, which is connected to a network (not shown). In the example, the network device may be the access point, the controller, an access point that includes the functionality of a controller, a switch (e.g., mobility access switch), or other such device. Additionally, by way of an example, one network device may be a controller while another network device may be an access point. The network device that is the access point in the example may or may not be connected to the network via the network device that is a controller.

Access points are digital devices that may be communicatively coupled to one or more networks (e.g., Internet, an intranet, etc.). Access points may be directly connected to the one or more networks or connected via a controller. In other words, an access point may be directly connected to a particular controller. An access point may include a wireless access point (WAP) that communicates wirelessly with devices using WiFi®, Bluetooth® or related standards and that communicates with a wired network.

In one or more embodiments, replicated network device A (120) and replicated network device B (125) are fake network devices, as indicated by the dotted lines. Replicated network device A (120) and replicated network device B (125) are created by replicator (110) to test a component of the network (e.g., network device A (105)). Similarly, replicated client device A (135), replicated client device B (140), replicated client device C (145), replicated client device D (150) are fake client devices, as indicated by the dotted lines, and were created by replicator (110) to test a component of the network. These replicated devices are fake in that they do not exist. Rather, replicator (110) modified and/or duplicated actual packets from the network to cause the component of the network that is undergoing a test to believe that these fake devices exist. Thus, when the component being tested receives packets from these fake devices, the component being tested responds as though these fake devices are real. It will be apparent to one of ordinary skill in the art that any number of devices in any level or location within the network may be replicated and, as such, the invention should not be limited to the above examples or the configuration shown in FIG. 1.

In one or more embodiments, replicator (110) is a server, rack, computer, laptop, smart phone, tablet computer, router, switch, controller, or other suitable device. In one or more embodiments, replicator (110) is a network device, as described below. Specifically, replicator (110) may be a device inserted into a network for managing and/or testing a network. Replicator (110) may be inserted into a network at any point to replicate network components. In one or more embodiments, replicator (110) is a separate device from the device which is being tested in the network. Alternatively, replicator (110) may be the same device as the device being tested in the network. In one or more embodiments, replicator (110) may also include an application (not shown) which includes any or all of the functionality described with regards to replicator (110), below.

In one or more embodiments, replicator (110) is able to simulate any network component to the right of replicator (110). Thus, using FIG. 1 as an example, replicator (110) may replicate network device B (115) and/or client device (130). If, for example, replicator (110) were placed to the right of network device B (115), replicator (110) would then be able to replicate client device (130). In one or more embodiments of the invention, replicator (110) is able to replicate any type of component of a network including, but not limited to: servers, racks, laptops, desktop computers, cell phones, smart phones, tablets, etc. In one or more embodiments, replicator (110) is owned, controlled, or operated, by a party different than the party that owns, controls, or operates one or more network device (105, 115). Alternatively, replicator (110) may be owned, controlled, or operated by the same party as one or more network devices (105, 115). In one or more embodiments, replicator (110) is placed directly to the right of the device that is being tested. Thus, again using FIG. 1 as an example, replicator (110) is testing network device A (105). Alternatively, in another embodiment, replicator (110) may be placed at a location that is not immediately to the right of the device being tested.

In one or more embodiments, replicator (110) includes functionality for intercepting real traffic over a network, performing deep packet inspection (DPI) on the traffic, and forwarding the traffic to the intended destination. The traffic may be intercepted & forwarded to the intended destination in any manner now known or later developed. In one or more embodiments, replicator (110) may simply allow network traffic to "pass through" replicator (110). Replicator (110) may send and/or receive both wired and wireless traffic.

Deep packet inspection (DPI) is a form of network packet filtering, and may be used for many different purposes. A message sent from one computing device to another takes the form of one or more packets. These packets may be forwarded amongst and/or between any number of intermediate devices before they reach their destination(s). DPI involves inspecting the contents of these packets at an inspection point, such as replicator (110). An inspection point may be any device in the path from the sending device/starting point to the receiving device/end point. In some instances, the inspection point may be a device that is not a direct part of the path the messages travels. For example, if a messages travels from device A to device B to device C, device B may send the message to device Z for DPI. Replicator (110) may perform the DPI in any manner now known or later developed.

In one or more embodiments, by performing DPI, replicator (110) is able to learn all stateless and stateful sessions of real traffic flowing to the device to be tested. Additionally, replicator (110) is able to learn and/or identify any other information that may be contained in the packets, such as control data, a source Media Access Control (MAC) address, a source Internet Protocol (IP) address, a destination MAC address, a destination IP address, a Service Set Identifier (SSID), a Basic Service Set Identifier (BSSID), the payload of the packet, a header, checksums, etc. In general, it will be apparent to one of ordinary skill in the art that the DPI enables replicator (110) to determine what aspects of a packet should be modified for the modified packet to appear as a "new" packet and, as such, the invention should not be limited to the above examples.

In one or more embodiments, replicator (110) includes functionality for generating "fake" packets. The fake packets may be generated by modifying the real packets on which DPI has been performed. Any portion(s) of the packets may be modified. For example, the source IP address or source MAC address may be modified to create the illusion that an additional source that does not exist, such as a fake client device, is sending the message. Alternatively, or in addition, modifying the packet may involve computing a new checksum. In one or more embodiments, the modification to a given packet may be based on the given packet that is being modified. Alternatively, the modifications made to a given packet may be based on more than one packet. In one or more embodiments, only packets arriving from the right side of replicator (110) may be modified. Alternatively, packets arriving from the left side of replicator (110) may be modified. In one or more embodiments, the modifications may include encrypting and/or decrypting the packets.

In one or more embodiments, replicator (110) includes functionality for replicating packets. Specifically, before or after modification, packets may be duplicated to give the illusion of a large amount of network activity to the device being tested. Replicator (110) may replicate traffic from multiple different devices, on multiple different levels, simultaneously. In one or more embodiments, replicator (110) includes functionality for tracking modified and/or replicated sessions. The modified and/or replicated sessions may be tracked in any manner now known or later developed.

In one or more embodiments, replicator (110) includes functionality for dropping replies to fake packets. The replies may be dropped in any manner now known or later developed. In one or more embodiments, upon receiving a reply to a fake packet, the stored session associated with the fake packet is removed, when applicable.

In one or more embodiments, replicator (110) includes functionality for learning session parameters and properties of packets for a given connection. The session parameters and properties of packets may include, but are not limited to: checksums, control frame data, headers, payload, source MAC address, IP address, increment, random, etc. The given connection may be associated with a particular type of client device, network device, application, function, action, etc. After learning a particular connection, replicator (110) is able to identify other connections of that type. Additionally, in one or more embodiments, replicator (110) includes functionality to create templates based on learned connections. The templates may be used by replicator (110) to quickly create fake network components and/or client devices, without having to spend as much time monitoring the real network traffic. In one or more embodiments, templates created based on a first network may be used on a second network.

Figure 2:
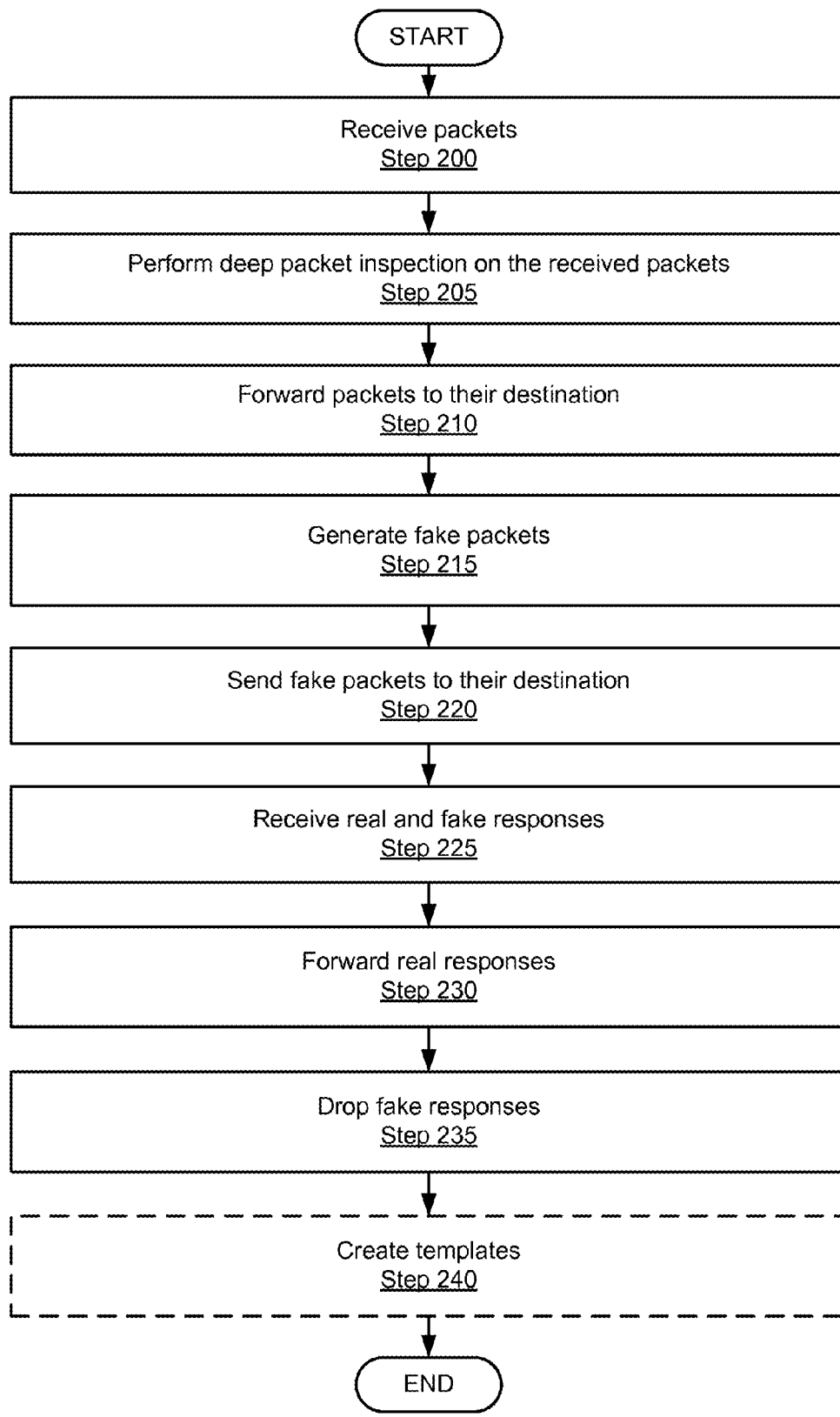
FIG. 2 shows a flowchart of a method in accordance with one or more embodiments of the invention.

FIG. 2 shows a flowchart of a method for testing by simulation using variations of real-time traffic. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 2 should not be construed as limiting the scope of the invention.

In Step 200, packets are received, in accordance with one or more embodiments. The packets may be received via a wired and/or wireless connection, and may be in any format now known or later developed. The packets may come from any number and type of network devices, client devices, or other devices connected to the network. Specifically, the packets are from real network devices and/or clients, and are real-time, live network traffic.

In Step 205, DPI is performed on the received packets, in accordance with one or more embodiments. The DPI may be performed in any manner now known or later developed. In particular, the DPI may identify any aspect about the packets including, but not limited to: a source MAC address, a destination MAC address, a source IP address, a source IP address, SSID, BSSID, checksum, header, control information, etc.

In Step 210, the packets are forwarded to their destinations, in accordance with one or more embodiments. The packets may be forwarded to their destinations in any manner now known or later developed. Specifically, the packets forwarded in this step are real network traffic. The packets may be forwarded using a wired and/or wireless connection. Optionally, the packets may be forwarded to their destination before, after, or during the DPI of Step 205.

In Step 215, fake packets are generated, in accordance with one or more embodiments. The fake packets may be generated by modifying existing, real network traffic packets. The fake packets may be generated based on a single real packet, or multiple real packets. Further, the fake packets may be based on a pattern amongst a grouping of packets. Additionally, the fake packets may be based on traffic from more than one network, where applicable. For example, if a template is used, traffic from a pre-existing, separate network may be used to generate fake packets. In one or more embodiments, the fake packets may be copied versions of modified and/or unmodified packets. The fake packets are used to test a given network device, and are used to represent additional client devices and/or network devices, thereby allowing the network device under test to experience lots of traffic from a variety of sources.

In Step 220, the fake packets are sent to their destinations, in accordance with one or more embodiments. The fake packets may be sent using any method and/or format now known or later developed. Further, the fake packets may be sent using a wired and/or wireless connection.

In Step 225, responses to real packets and fake packets are received, in accordance with one or more embodiments. The responses received may be generated, or forwarded, by the device under test. Since the device under test is unable to distinguish fake packets from real packets, all of the received responses are genuine. The responses may be received via a wired and/or wireless connection in any manner or format now known or later developed.

In Step 230, responses to real packets are forwarded to their destination, in accordance with one or more embodiments. The packets may be forwarded using a wired and/or wireless connection, and may be sent in any format now known or later developed.

In Step 235, responses to fake packets are dropped, in accordance with one or more embodiments. The fake packets are dropped so as to not cause errors with the various network components. Because the device to which the fake replies are addressed is not a real device, the fake responses may simply be ignored. In one or more embodiments, if there is a session associated with the fake response, the session is closed once the response is received. It will be apparent to one of ordinary skill in the art that there are many ways to drop fake responses and, as such, the invention should not be limited to the above examples.

In Step 240, templates are created, in accordance with one or more embodiments. Templates may be used to represent particular types of network devices and/or clients, as well as behavior specific to certain applications, functions, actions, etc. The templates are based on real network traffic, and may be built over time, as the invention slowly learns to identify various kinds of devices and traffic. The templates may be created on one network, and used on a second, unrelated network to quickly and efficiently create a testing environment on the second network.

The following section describes various examples of the invention. The examples are included to aid in the understanding of the invention and are not intended to limit the scope of the invention.

FIGS. 3A-3D show a simplified example in accordance with one or more embodiments. Specifically, in FIG. 3A a small network is shown consisting of access point (300), replicator (305), client device (310) and replicated client device (315). Replicator (305) is inserted to the right, of access point (300), which is the device under test. As replicator (305) monitors traffic on the network, client device (310) send packet (320) to access point (300). Replicator (305) intercepts packet (320) and performs DPI to determine the various parameters and data within packet (320). At this point, the example moves to FIG. 3B.

In FIG. 3B, replicator (305) has completed the DPI of packet (320), and has generated a fake packet (325) by modifying the contents of packet (320). Specifically, the source of the packet has been modified: fake packet (325) identifies replicated client device (315) as the source while packet (320) identifies client device (310) as the source. Thus, in FIG. 3B, both packet (320) and fake packet (325) are forwarded on to access point (300). Additionally, replicator (305) has created fake session (330) to track the session associated with fake packet (325).

Figure 3C:
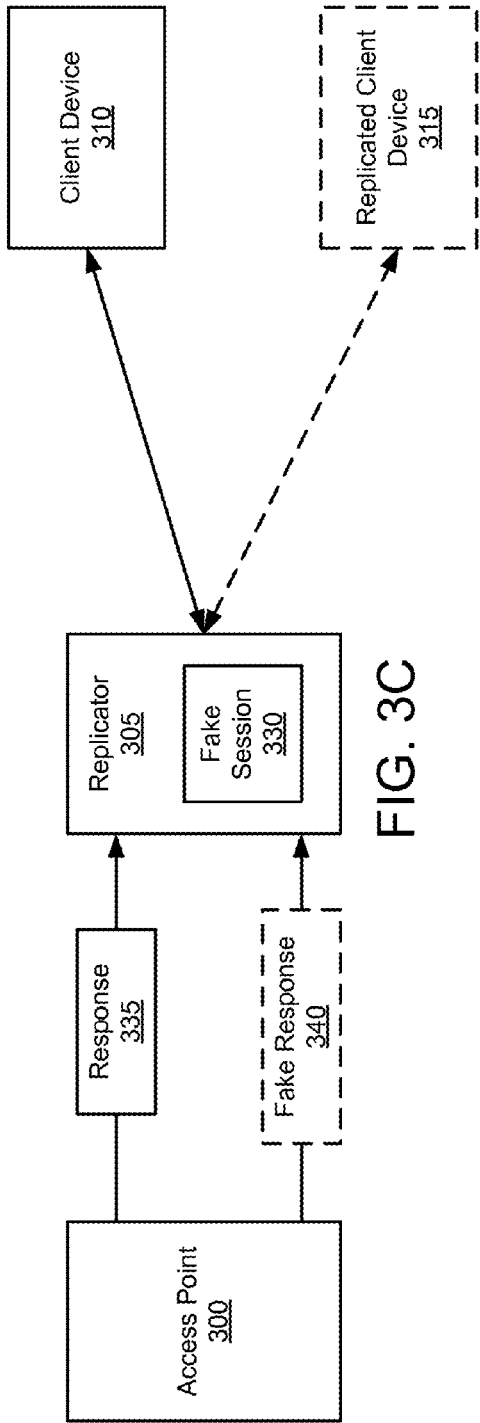
Figure 3D:
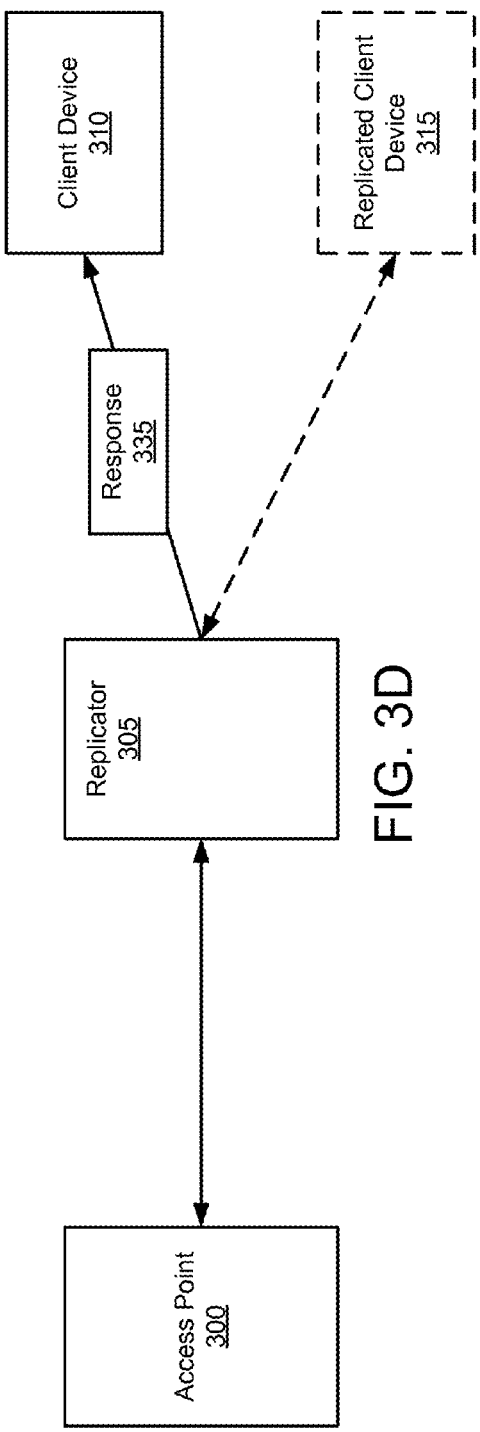

Moving to FIG. 3C, access point (300) has sent response (335) in response to packet (320), and sent fake response (340) in response to fake packet (325). Access point (300) does not know, however, that fake response (340) is a fake. Rather, from the point of view of access point (300), both packets were real, and two real client devices are attempting to communicate with access point (300). Finally, moving to FIG. 3D, replicator (305) has forwarded response (335) to client device (310), while dropping fake response (340), as there is no need to send a fake response to replicated client device (3115). Further, fake session (330) has been closed, as a response to fake packet (325) was received.

Figure 4:
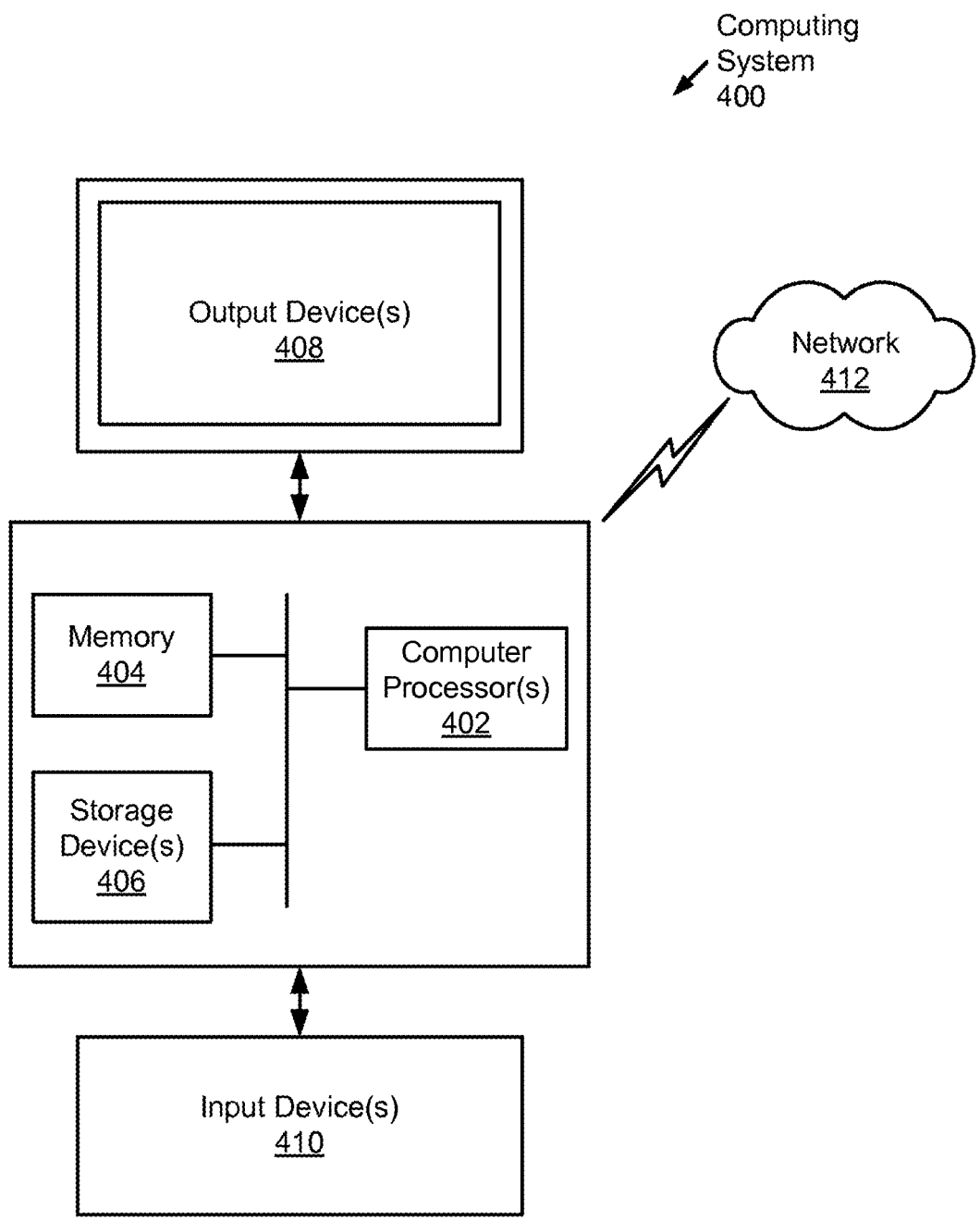
FIG. 4 shows a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   receiving, by a first system, a first packet from a second system to be transmitted to a third system;
   forwarding, by the first system to the third system, the first packet received from the second system;
   modifying a portion of the first packet to obtain a second packet that falsely identifies a fourth system as a source of the second packet; and
   transmitting, by the first system to the third system, the second packet identifying the fourth system as the source of the second packet.

2. The method of claim 1, further comprising:
   receiving, by the first system, a third packet that is (a) responsive to the first packet and (b) addressed to the second system; and
   forwarding, by the first system to the second system, the third packet.

3. The method of claim 2, further comprising:
receiving, by the first system, a fourth packet that is (a) responsive to the second packet and (b) addressed to the fourth system,
wherein the fourth system does not exist.

4. The method of claim 1, wherein the second system is an access point and the third system is a controller.

5. The method of claim 1, wherein the second system is a client device and the third system is an access point.

6. The method of claim 1, wherein the third system comprises a plurality of devices.

7. The method of claim 1, wherein the second system comprises a plurality of devices.

8. The method of claim 1, wherein the second packet is computed based on the first packet and a third packet.

9. The method of claim 1, wherein the first packet and the second packet are control packets.

10. The method of claim 1, wherein the modified portion of the first packet comprises one or more of: a source Media Access Control (MAC) address or a source Internet Protocol (IP) address.

11. The method of claim 1, wherein the modified portion of the first packet comprises one or more of: Service Set Identifier (SSID) or a Basic Service Set Identifier (BSSID).

12. The method of claim 1, further comprising:
modifying one or more fields of the first packet to obtain a third packet;
computing a checksum for the third packet; and
generating the second packet using (a) the third packet with the modified one or more fields and (b) the checksum for the third packet.

13. The method of claim 1, further comprising:
decrypting the first packet to obtain a decrypted packet;
modifying one or more fields of the decrypted packet to obtain a third packet; and
encrypting the third packet to obtain the second packet.

14. A method comprising:
receiving, by a first system, a first set of packets from a second system to be transmitted to a third system;
forwarding, by the first system to the third system, the first set of packets received from the second system;
identifying a pattern or protocol associated with the first set of packets;
generating a second set of packets, based on the pattern or the protocol, that that falsely identify a fourth system as a source of the second set of packets; and
transmitting, by the first system to the third system, the second set of packets identifying the fourth system as the source of the second set of packets.

15. The method of claim 14, further comprising:
receiving, by the first system, a third set of packets that are (a) responsive to the first set of packets and (b) addressed to the second system; and
forwarding, by the first system to the second system, the third set of packets.

16. The method of claim 15, further comprising:
receiving, by the first system, a fourth set of packets that are (a) responsive to the second set of packets and (b) addressed to the fourth system,
wherein the fourth system does not exist.

17. The method of claim 14, wherein the second system is an access point and the third system is a controller.

18. The method of claim 14, wherein the pattern or protocol comprises one or more of: Service Set Identifier (SSID) or a Basic Service Set Identifier (BSSID).

19. The method of claim 14, wherein the third system comprises a plurality of devices.

* * * * *